United States Patent
Ugolini

(12) 
(10) Patent No.: US 6,467,944 B2
(45) Date of Patent: Oct. 22, 2002

(54) ICED-BEVERAGE MAKING MACHINE PROVIDED WITH A DEVICE FOR CONTROLLING THE BEVERAGE DENSITY

(75) Inventor: Giancarlo Ugolini, Milan (IT)

(73) Assignee: Ugolini S.p.A. (IT)

( * ) Notice: Subject to any disclaimer, the term of this patent is extended or adjusted under 35 U.S.C. 154(b) by 36 days.

(21) Appl. No.: 09/851,213

(22) Filed: May 7, 2001

(65) Prior Publication Data
US 2001/0042445 A1 Nov. 22, 2001

(30) Foreign Application Priority Data
May 16, 2000 (IT) .......................... MI2A01076

(51) Int. Cl.$^7$ ........................ A23G 9/12; B01F 15/06; B01F 7/08
(52) U.S. Cl. ........................ 366/144; 366/273; 62/136; 62/342
(58) Field of Search ................... 366/144, 145, 366/147, 273, 274; 62/136, 342; 99/348

(56) References Cited

U.S. PATENT DOCUMENTS 2,566,743 A * 9/1951 Okulitch et al.
3,279,765 A * 10/1966 Sato et al.
3,698,203 A * 10/1972 Stoelting
4,314,451 A * 2/1982 Leeds et al.
5,906,105 A * 5/1999 Ugolini

FOREIGN PATENT DOCUMENTS

EP 0 799 575 * 10/1997
JP 411108524 * 4/1999

* cited by examiner

*Primary Examiner*—Tony G. Soohoo
(74) *Attorney, Agent, or Firm*—Shlesinger, Fitzsimmons & Shlesinger

(57) ABSTRACT

An iced-beverage making machine comprises a tank (11) to contain the beverage, a mixer (12) to stir the beverage in the tank and a refrigerating circuit (14) to cool the beverage in the tank. The mixer is connected by a magnetic joint to a movement reduction motor (13). The magnetic joint comprises a driving portion (16) which is provided with a crown of first magnets (22) and is connected to the reduction motor (13), and a driven portion (17) which is provided with a crown of second magnets (21) and is connected to the mixer and magnetically driven in rotation by the driving portion. Close to the two magnet crowns there is the presence of means (23, 24) for detecting the angular phase displacement of the two crowns relative to the angular position of maximum attraction between the magnets, the detecting means sending a disabling signal (26) to the refrigerating circuit when the detected angular phase displacement exceeds a preestablished value. In this manner, density of the produced iced beverage is adjusted.

6 Claims, 2 Drawing Sheets

ICED-BEVERAGE MAKING MACHINE PROVIDED WITH A DEVICE FOR CONTROLLING THE BEVERAGE DENSITY

BACKGROUND OF THE INVENTION

The present invention relates to an iced-beverage making machine, such as a water-ice making machine. Generally, these machines involve the presence of a tank containing the product to be dispensed and in which a mixing propeller and an evaporator for a beverage refrigerating circuit are present. A problem felt in these machines is to avoid complete freezing of the beverage, keeping the beverage itself close to a preestablished optimal density value. The desired density value is included in a rather narrow range: an excessive density increase produces quick stopping of the propeller, or at all events overload of the motor, whereas a too low density results in a beverage qualitatively unacceptable by a consumer.

Unfortunately, in iced-beverage making machines the cooling system is not controllable based on the beverage temperature. In fact, iced beverages are a mixture of water, sugar and other additives that are kept in an equilibrium state between the liquid and solid phases and their density is a function of the relative percentages of the two phases. Since the physical phenomenon of the change of state from liquid to solid is a phenomenon taking place at a constant temperature, this temperature will not vary during the change of state, which will make it impossible to control the equilibrium state through the temperature. In the known art, several different systems for detecting parameters that are indicative of the true density of the product were proposed for use in the refrigeration control. Generally they are based on detection of operating magnitudes supplying an indication of the torque offered by the iced beverage on movement of the mixer. For instance, measurement of the values of the electric current absorbed by the motor operating the mixer was proposed, using then such values as indices of the resisting torque on the mixer propeller. Unfortunately however, in the case of small electric motors using reduction gears for increase of the delivered torque, the absorbed current does not supply a reliable adjustment parameter.

Thus, mechanical systems for torque detection were proposed that can presently be considered, in their different embodiments, as the universally adopted systems for refrigeration control. Generally, these mechanical systems involve a certain freedom degree in the electric motor mounting that for instance can rotate around its output shaft against a resisting force (a spring or the weight of the power unit suitably eccentrically arranged, for example). To enable calibration of the intervention density, a preload spring is provided that counteracts the movement of the power unit due to the resisting torque on the propeller.

On increasing of the resisting torque on the propeller, the power unit rotates through an increasingly wider angle until a microswitch controlling turning off of the refrigerating system is operated. Once the refrigerating system has been turned off, density will begin lowering by effect of the iced beverage melting. Consequently the resisting torque will decrease causing return of the power unit to its starting position and shutting off of the microswitch which will give rise, as a result, to restarting of the refrigerating system.

Even if in more sophisticated systems the microswitch was replaced by a different sensor detecting rotation of the power unit, such as an optical photodiode system, all devices of the known art suffer from the disadvantage of an excessive mechanical complexity, and from the requirement of providing appropriate spaces for movement of the whole power unit under the action of the resisting torque. In addition, reliability and constancy of intervention rely on the preload spring counteracting the movement of the power unit, which spring needs an accurate starting calibration and periodical adjustments.

It is a general aim of the present invention to obviate the above mentioned drawbacks by providing an iced-beverage making machine which is equipped with a precise, simple and reliable system for detecting the density of the product in order to control of the beverage refrigeration.

SUMMARY OF THE INVENTION

In view of the above aim, in accordance with the invention, an iced-beverage making machine has been devised which comprises a beverage-containing tank, a mixer to stir the beverage in the tank which is connected by a magnetic joint to a movement reduction motor and a refrigerating circuit to cool the beverage in the tank, the magnetic joint comprising a driving portion which is provided with a crown of first magnets and is connected to the reduction motor, and a driven portion which is provided with a crown of second magnets and is connected to the mixer and magnetically driven in rotation by the driving portion, characterised in that close to the two magnet crowns there is the presence of means for detecting the angular phase displacement of the two crowns relative to the angular position of maximum attraction between the magnets, the detecting means sending a disabling signal to the refrigerating circuit when the detected angular phase displacement exceeds a preestablished value.

BRIEF DESCRIPTION OF THE DRAWINGS

For better explaining the innovative principles of the present invention and the advantages it offers over the known art, a possible embodiment applying said principles will be described hereinafter, by way of example, with the aid of the accompanying drawings. In the drawings.

DETAILED DESCRIPTION OF THE INVENTION

Figure 1:
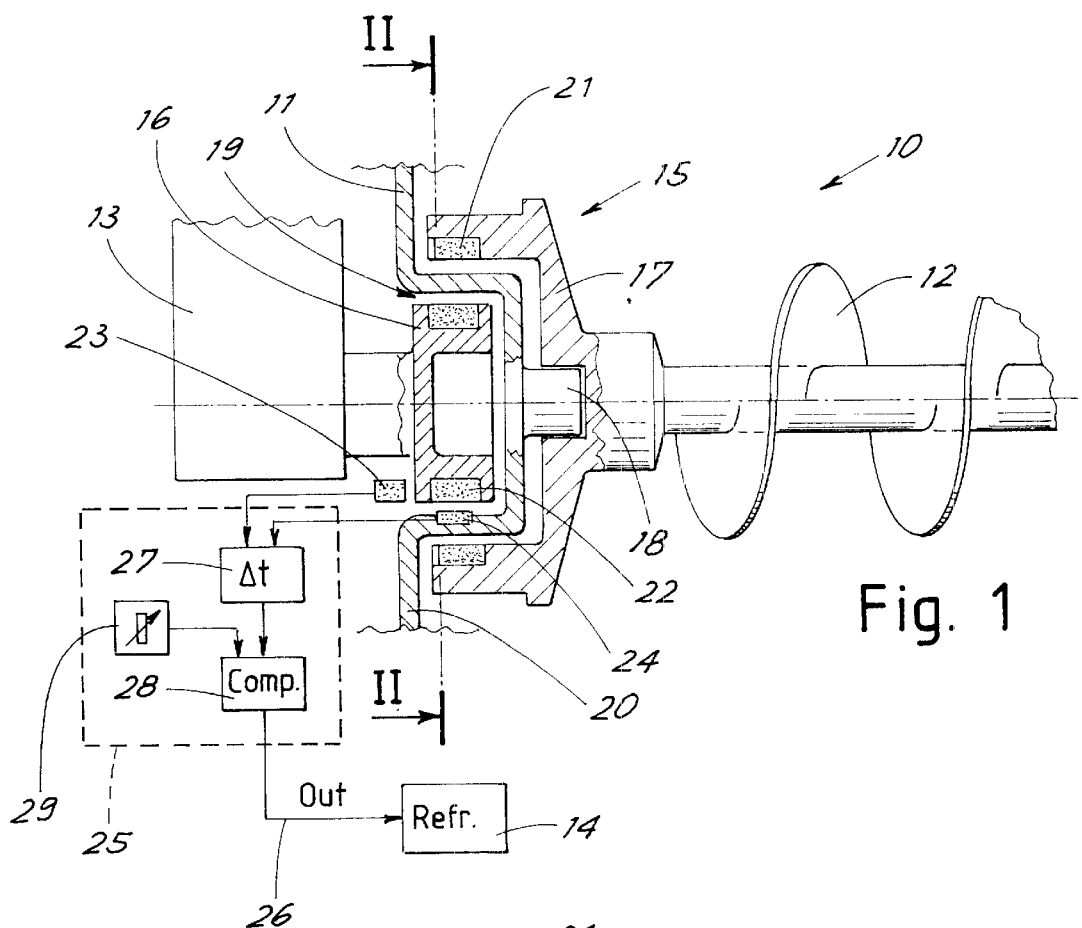
FIG. 1 is a diagrammatic view partly in section of an iced-beverage making machine in accordance with the invention.

With reference to the figures, shown in FIG. 1 is an iced-beverage making machine generally denoted by 10, comprising a tank 11 for containing the beverage, in which a mixing propeller 12 is present, which propeller is powered by an electric reduction motor 13. Also acting in the tank is a refrigerating unit 14 for beverage cooling. A machine of the above type, with a dispenser for drawing measured amounts or doses of the beverage from the tank upon command, is well known to a person skilled in the art and will not be herein further described or shown.

For connection between the propeller and reduction motor a magnetic coupling 15 is provided which is formed of a first portion, or driving magnetic unit 16, fitted on the drive shaft of the reduction motor 13, and a second portion, or driven magnetic unit 17, fitted on the propeller shaft. The two magnetic units each have a plurality of circumferentially spaced apart magnets, denoted by 21, 22, to form a magnet crown around the rotation axis, as clearly shown in FIG. 2.

The two portions of the magnetic coupling are disposed on opposite faces of a wall of tank 11 and interact with each other through the wall thickness. Advantageously, on the inner side of the tank, the wall comprises a pivot pin 18 for the propeller rotation. The wall further comprises a region 19 which is recessed inwardly of the tank to define a cylindrical crown 20 through which the two magnetic units face each other in a direction transverse to the rotation axis.

Such a magnetic coupling is described in the European patent application EP 0 799 575. Use of the magnetic joint enables easy dismantling of the propeller and prevents shutdown of the motor in case of accidental jamming of the propeller.

According to the principles of the present invention, the machine 10 comprises a pair of sensors 23 and 24. Sensor 23, or reference sensor, is arranged to supply a periodical reference signal during rotation of the driving magnetic unit 16. Advantageously, such a sensor can be a known magnetic sensor (of the Hall effect type, for example) detecting passage of magnets 22. The detection direction of the sensor is therefore directed to unit 16, parallel to the rotation axis thereof. Alternatively, a known optical sensor may also be provided, of the reflection type for example, detecting appropriate signs disposed at intervals on the magnetic unit. Other types of sensors can be easily envisaged by a person skilled in the art.

The second sensor, or detection sensor, 24 is a magnetic sensor disposed at the air gap between the magnets of the driven and driving units. Advantageously, it can be anchored to wall 20, on the outer side of the tank. The detection direction is of such a nature that sensor 24 is influenced by the field lines between the inner and outer magnets of the magnetic joint.

Figure 2:
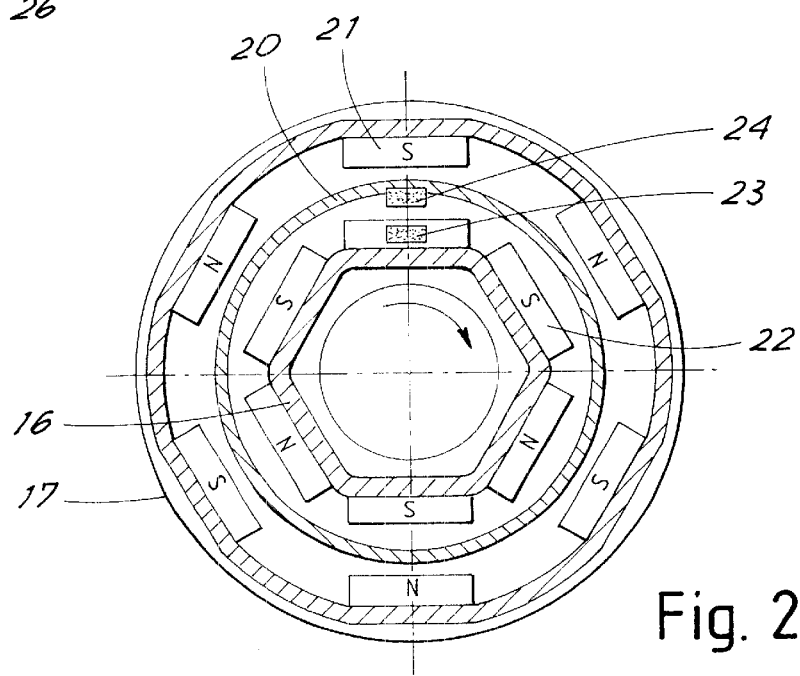
FIG. 2 is a diagrammatic view in section taken along line II—II in FIG. 1 of a region of the magnetic joint of the machine.

Still advantageously, the two sensors are aligned according to a diameter of the magnetic unit, as shown in FIG. 2. The two sensors are connected with an electronic control device 25 having an output 26 for operation of the refrigerating unit 14. Device 25 comprises a block 27 detecting the time difference $\Delta t$ at the activation instants of the two sensors and sending it to a comparator block 28. The comparator block compares the detected $\Delta t$ with a value $\Delta max$ which was previously established to be the maximum admissible value during standard operation of the machine. This preestablished value can be entered by means of a regulator 29. When value $\Delta t$ exceeds value $\Delta max$, the control device output 26 stops refrigerator 14, thereby interrupting the beverage cooling. When value $\Delta t$ goes back to a lower value than value $\Delta max$, the output 26 starts the refrigerator again and the beverage cooling is resumed. As can be easily understood by a person skilled in the art, an activation hysteresis at approximately the value $\Delta max$ can be obviously provided in order to avoid control unsteadiness during the machine operation.

As will be clear in the following, with the above described device a precise control on the density of the product contained in the tank can be carried out.

In fact, in magnetic transmission the phase displacement between the magnets of opposite polarities of the driving and driven units depends on the transmitted torque. For instance, shown in FIG. 2 is a coupling with a zero phase displacement (i.e. in which the magnets of the first unit perfectly face those of the other unit). Such a condition is obtained with a transmitted torque which is substantially zero or, at all events, relatively low with respect to the attraction force between the magnets (and therefore to the maximum torque transmissible from the magnetic joint).

Figure 3:
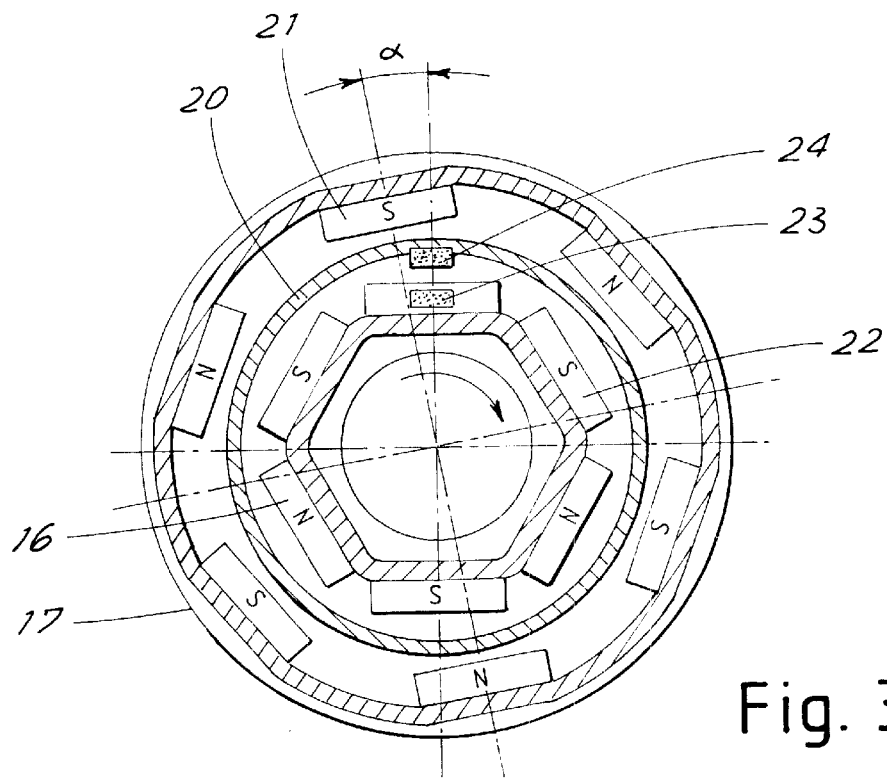
FIG. 3 represents a view similar to that in FIG. 2, but with the magnetic joint in a different position.

On increasing of the resistance to rotation of the propeller, the driven unit lags behind relative to the driving unit and the magnets of the magnet pairs of the two units gradually move away from each other. This is shown in FIG. 3, where by effect of a resisting torque on the propeller there is a phase displacement a between the two portions of the magnetic coupling.

While the signal produced by the reference sensor 23 (which is substantially only affected by rotation of the driving unit 16) goes on varying due to passage of the references (or magnets) present on the driving unit, the detection signal 24 is submitted to periodical variations of the magnetic field that reach the maximum value with a delay increasingly growing on increasing of angle $\alpha$, as a result of the inclination taken by the magnetic axis passing between the magnets of the two units with respect to the radial direction. In other words, the detection sensor actually does not measure the delay of the driven magnets relative to the driving magnets, but the deformation of the magnetic field caused by such a delay. This was found to be advantageous because for efficiently measuring the delay of the driven magnets it would have been necessary to put the second sensor to a position so close to the driven magnets (in the same manner as done with the reference sensor for the driving magnets) that positioning of same would have been very difficult, and in some cases even impossible, if it was wished to keep it outside the tank.

Figure 4:
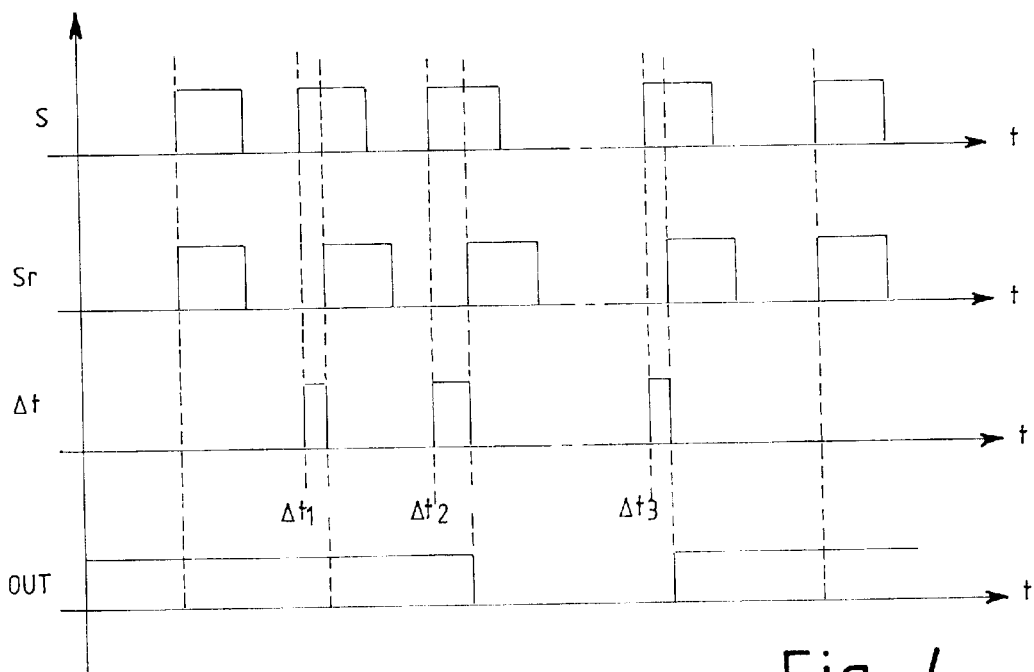
FIG. 4 represents a diagram showing the electric signals produced in the machine in FIG. 1.

All that is made clear in FIG. 4, where signals S emitted by the detection sensor and signals Sr emitted by the reference sensor are shown. For the sake of simplicity it is supposed that the two sensors are of the digital or ON-OFF type, i.e. that the signal emitted by them passes from a low value to a high value when the detected magnitude exceeds a given threshold, without supplying intermediate values. Use of digital sensors was found to be advantageous due to simplicity of operation of the control device.

Shown in FIG. 1 is the effect of a progressive increase of the resisting torque, i.e. the density of the product in the tank. First, the signals emitted by the sensors are in timed relationship with each other and no difference signal $\Delta t$ exists. The output of the control device keeps the refrigerator in operation.

Upon increasing of the resisting torque, signals S and Sr increase their phase displacement and consequently the duration of signal $\Delta t$ increases, which signal goes for instance from a value $\Delta t_1$ to a value $\Delta t_2$. Until the value $\Delta t$ is smaller than the preestablished maximum value $\Delta max$, the output OUT keeps active. When the value $\Delta t$ exceeds the preestablished maximum value $\Delta max$, the output OUT goes down to zero and the refrigerator is shut off.

For instance, in FIG. 4 $\Delta t_1$ is supposed to be <$\Delta max$ and $\Delta t_2$ to be >$\Delta max$. When $\Delta t$ goes down again under the value $\Delta max$, the output OUT starts the refrigerator again. In the figure this is supposed to take place for $\Delta t_3$.

It is to be recognised that by using the reference signal produced by rotation of the driving magnets the phase displacement value between the two magnetic units can be corrected against the effects of possible fluctuations of the rotation speed of the motor (for instance by effect of fluctuations in the supply voltage).

At this point it is apparent that the intended purposes are achieved. By adjusting the reference value $\Delta max$ it is possible to keep the density of the iced beverage close to a preestablished value with an excellent precision, also optimising the times for reaching the optimal dispensing density starting from the beverage in a liquid state. By virtue of the solution of the present invention, all mechanical members required in the embodiments of the known art are eliminated. This enables a greater sturdiness and reliability and a much lower manufacturing cost.

Obviously, the above description of an embodiment applying the innovative principles of the present invention is given by way of example only and therefore must not be considered as a limitation of the scope of the patent rights herein claimed. For instance, the shape of the magnetic joint can be different from the one shown.

What is claimed is:

1. An iced-beverage making machine comprising a beverage-containing tank, a mixer to stir the beverage in the tank which is connected by a magnetic joint to a movement reduction motor and a refrigerating circuit to cool the beverage in the tank, the magnetic joint comprising a driving portion which is provided with a crown of first magnets and is connected to the reduction motor, and a driven portion which is provided with a crown of second magnets and is connected to the mixer and magnetically driven in rotation by the driving portion, characterised in that close to the two magnet crowns there is the presence of means for detecting the angular phase displacement of the two crowns relative to the angular position of maximum attraction between the magnets, the detecting means sending a disabling signal to the refrigerating circuit when the detected angular phase displacement exceeds a preestablished value.

2. A machine as claimed in claim 1, wherein the detecting means comprises a first sensor emitting signals indicating the periodical passage of the magnets of the driving portion and a second sensor responsive to magnetic fields and disposed between the magnet crowns to be influenced by the passage of the magnetic field between the magnets of the crowns and to emit a signal for each passage, the angular phase displacement of the crowns being calculated as a time gap between the periodical-passage signal emitted from the first sensor and the passage signal of the second sensor.

3. A machine as claimed in claim 2, wherein the first sensor too is a magnetic sensor and is disposed close to the crown of the driving portion to be substantially influenced by the magnets thereof.

4. A machine as claimed in claim 2, wherein the first sensor too is an optical sensor and is disposed close to the crown of the driving portion to detect passage of references thereon.

5. A machine as claimed in claim 2, wherein said second sensor is disposed on a portion of the tank wall separating the two crowns.

6. A machine as claimed in claim 2, wherein a magnitude representative of said time gap between the passage signals is sent to a comparator comparing this magnitude with a reference value and emitting a disabling signal for the refrigerating circuit when the reference value is exceeded.

* * * * *